United States Patent
Suhama et al.

(10) Patent No.: US 9,515,583 B2
(45) Date of Patent: Dec. 6, 2016

(54) ROTARY ELECTRIC MACHINE CONTROL SYSTEM AND ROTARY ELECTRIC MACHINE CONTROL METHOD

(75) Inventors: Masayoshi Suhama, Toyota (JP); Kazuhide Miyata, Toyota (JP); Daisuke Ogino, Nishio (JP)

(73) Assignees: TOYOTA JIDOSHA KABUSHIKI KAISHA, Toyota-Shi (JP); AISIN AW CO., LTD., Anjo-Shi (JP)

( * ) Notice: Subject to any disclaimer, the term of this patent is extended or adjusted under 35 U.S.C. 154(b) by 139 days.

(21) Appl. No.: 14/344,128

(22) PCT Filed: Sep. 11, 2012

(86) PCT No.: PCT/IB2012/001751
§ 371 (c)(1),
(2), (4) Date: Mar. 11, 2014

(87) PCT Pub. No.: WO2013/038250
PCT Pub. Date: Mar. 21, 2013

(65) Prior Publication Data
US 2014/0340007 A1    Nov. 20, 2014

(30) Foreign Application Priority Data
Sep. 14, 2011 (JP) ................................. 2011-200441

(51) Int. Cl.
*H02P 23/00* (2016.01)
*H02P 6/00* (2016.01)
(Continued)

(52) U.S. Cl.
CPC ............. *H02P 6/002* (2013.01); *B60L 15/025* (2013.01); *H02P 6/28* (2016.02); *H02P 21/0021* (2013.01);
(Continued)

(58) Field of Classification Search
CPC ................ H02P 2005/4007; H02P 2005/4013; H02P 6/18; H02P 2007/056; H02P 2007/6204; H02P 21/0039; H02P 25/083; H02P 2209/13
(Continued)

(56) References Cited

U.S. PATENT DOCUMENTS

2008/0218111 A1    9/2008  Okamura
2009/0108794 A1*   4/2009  Ochiai .............. H02M 7/53875
                                                       318/760

(Continued)

FOREIGN PATENT DOCUMENTS

JP     2006-320039 A    11/2006
JP     2007-020383 A     1/2007
(Continued)

*Primary Examiner* — Eduardo Colon Santana
*Assistant Examiner* — Bickey Dhakal
(74) *Attorney, Agent, or Firm* — Andrews Kurth Kenyon LLP

(57) ABSTRACT

A rotary electric machine control system includes a rotary electric machine (second motor generator), a number-of-revolutions sensor that measures the number of revolutions per predetermined time period of the rotary electric machine, and a controller. The controller has a threshold changing unit for changing a control switching phase that is a control switching threshold to be used for switching the control mode of the rotary electric machine, according to a measurement result of the number of revolutions.

4 Claims, 8 Drawing Sheets

(51) Int. Cl.
  *H02P 21/00*     (2016.01)
  *B60L 15/02*     (2006.01)
  *H02P 27/06*     (2006.01)
  *H02P 27/08*     (2006.01)

(52) U.S. Cl.
  CPC ............ *H02P 21/20* (2016.02); *H02P 27/06* (2013.01); *H02P 27/08* (2013.01); *Y02T 10/643* (2013.01)

(58) Field of Classification Search
  USPC ........................................................ 318/798
  See application file for complete search history.

(56) References Cited

U.S. PATENT DOCUMENTS

| | | | |
|---|---|---|---|
| 2009/0159350 A1 | 6/2009 | Hanada et al. | |
| 2010/0072926 A1* | 3/2010 | Itoh .................. | B60L 11/123 318/400.09 |
| 2010/0072927 A1* | 3/2010 | Itoh .................. | B60L 11/123 318/400.09 |
| 2011/0115420 A1 | 5/2011 | Yamada | |
| 2011/0187308 A1* | 8/2011 | Suhama ................ | H02P 27/04 318/798 |

FOREIGN PATENT DOCUMENTS

| | | | |
|---|---|---|---|
| JP | 2010-41901 A | | 2/2010 |
| JP | 2010-081660 A | | 4/2010 |
| JP | 2010-081663 A | | 4/2010 |
| JP | 2010-172109 A | | 8/2010 |
| JP | 2010172109 A | * | 8/2010 |
| JP | 2011019302 A | | 1/2011 |
| JP | 2011-067010 A | | 3/2011 |
| WO | 2010/047221 A1 | | 4/2010 |

\* cited by examiner (a > b > c > d)

| VARIATION IN NUMBER OF REVOLUTIONS | 100 | 0 | −25 | −50 | −75 | −100 | −125 | −150 |
|---|---|---|---|---|---|---|---|---|
| SWITCHING PHASE | a° | a° | a° | b° | b° | c° | c° | d° |

(E0 < E1 < E2 < E3 < E4 < E5)

SLIP ←――――――――――――――→ GRIP

| | | | | | | | |
|---|---|---|---|---|---|---|---|
| VARIATION IN NUMBER OF REVOLUTIONS | 100 | 0 | −25 | −50 | −75 | −100 | −125 | −150 |
| SWITCHING MODULATION DEGREE | E0 | E0 | E1 | E2 | E3 | E4 | E5 | E5 |

Ei

ROTARY ELECTRIC MACHINE CONTROL SYSTEM AND ROTARY ELECTRIC MACHINE CONTROL METHOD

CROSS REFERENCE TO RELATED APPLICATION

This is a national phase application based on the PCT International Patent Application No. PCT/IB2012/001751 filed on Sep. 11, 2012, claiming priority to Japanese application No. 2011-200441 filed Sep. 14, 2011, the entire contents of both of which are incorporated herein by reference.

BACKGROUND OF THE INVENTION

1. Field of the Invention

The invention relates to a rotary electric machine control system and method, and more particularly to a rotary electric machine control system and method that switch a control mode of a rotary electric machine.

2. Description of Related Art

There is a method of controlling a rotary electric machine to be used as a motor or an electric generator, in which an appropriate one of control modes: a sine-wave pulse width modulation (PWM) control mode, an over-modulation control mode, and a rectangular-wave control mode, is selectively used. The over-modulation control mode is sometimes referred to as over-modulation PWM control mode.

For example, Japanese Patent Application Publication No. 2010-81663 (JP-2010-81663 A) describes a rotary electric machine control system that is designed to switch a control mode between a sine-wave current control mode, an over-modulation current control mode, and a rectangular-wave voltage phase control mode. This patent literature also describes that when a maximum efficiency characteristic line along which the rotary electric machine can be operated at its maximum efficiency is defined on a d-q plane defined by a d-axis and a q-axis that are used for vector control of the rotary electric machine, a switching line serving as a reference for switching from the rectangular-wave voltage phase control mode to the over-modulation current control mode is set on the smaller angle side of the maximum efficiency characteristic line. This patent literature says that chattering in control during mode switching can be avoided by setting the switching line on the smaller angle side.

However, when the switching line serving as a reference for switching from the rectangular-wave control mode to the over-modulation control mode is set on the smaller angle side of the maximum efficiency characteristic line on the d-q plane, the switching from the rectangular-wave control mode to the over-modulation control mode will be slow if the number of revolutions per unit time of the rotary electric machine rapidly drops. As a result, a voltage to be applied to the rotary electric machine may remain high even though the number of revolutions of the rotary electric machine has decreased. The rapid drop of the number of revolutions of the rotary electric machine can occur, for example, when the rotary electric machine is mounted on a vehicle for driving wheels, and the wheels shift from a slip state to a grip state. For example, when this vehicle runs on a wavy road, slip and grip may possibly be repeated alternately. The rapid drop of the number of revolutions of the rotary electric machine due to the occurrence of sudden grip may also occur when the vehicle runs on a projection on a road surface such as a cat's eye. In this case, the voltage applied to the rotary electric machine becomes excessively higher than a normally required voltage, and hence excessive phase current may flow through stator coils of the respective phases of the rotary electric machine. Thus, there is a room for improvement in effective prevention of possible breakdown of equipment caused by such excessive phase current.

Although the problem that may occur when the control mode is switched over from the rectangular-wave control mode to the over-modulation control mode has been described above, the problem of excessive current flowing though the rotary electric machine at the time of a rapid drop of the number of revolutions of the rotary electric machine may also occur when the control mode is switched over from the over-modulation control mode to the sine-wave PWM control mode. Specifically, a modulation degree is used for switching between the over-modulation control mode and the sine-wave PWM control mode. The modulation degree is a ratio of an effective value of line-to-line voltage that is a voltage applied to the rotary electric machine to a system voltage VH that is a direct current (DC) voltage of an inverter. If the modulation degree used for switching from the control over-modulation control mode to the sine-wave PWM control mode is too small, the switching from the over-modulation control mode to the sine-wave PWM control mode will become slow when the number of revolutions per unit time of the rotary electric machine rapidly drops, and as a result, the voltage applied to the rotary electric machine may remain high even though the number of revolutions of the rotary electric machine has been decreased. For example, when the rotary electric machine is mounted on a vehicle for driving wheels, and the wheels shifts from a slip state to a grip state, a voltage that is excessively higher than normally required may be applied to the rotary electric machine, and hence excessive phase current may flow through stator coils of the respective phases of the rotary electric machine. Thus, there is a room for improvement in effective prevention of possible breakdown of equipment caused by such excessive phase current.

SUMMARY OF THE INVENTION

The invention provides a rotary electric machine control system and method, with which it is possible to effectively prevent overcurrent from flowing through a rotary electric machine by rapidly switching its control mode at the time of a sudden change in the number of revolutions of the rotary electric machine.

A rotary electric machine control system according to a first aspect of the invention includes: a measurement device that measures the number of revolutions per predetermined time period of a rotary electric machine; and a threshold changing unit configured to change a control switching threshold to be used for switching a control mode of the rotary electric machine, in accordance with a measurement result of the number of revolutions.

In the rotary electric machine control system according to the first aspect of the invention, the control switching threshold may be a control switching phase on a d-q plane having a d-axis and a q-axis intersecting orthogonally with each other, on which an operating point of the rotary electric machine moves, wherein the control switching phase is used for switching the control mode of the rotary electric machine from a rectangular-wave control mode to an over-modulation control mode; and the threshold changing unit may be configured to change the control switching phase to be used for switching the control mode of the rotary electric machine from the rectangular-wave control mode to the over-modulation control mode, in accordance with the measurement result of the number of revolutions.

In the rotary electric machine control system according to the first aspect of the invention, the threshold changing unit may be configured to change the control switching phase to a sudden-change switching phase that is on a smaller angle side of a current command line drawn by connecting current commands when operation of the rotary electric machine is instructed by current control, and on a larger angle side of an initial switching phase, in accordance with a variation in the number of revolutions when the measured number of revolutions has decreased by a preset grip value or more; and the threshold changing unit may be configured to set the control switching phase to the initial switching phase when the measured number of revolutions has not decreased by the grip value or more.

In the rotary electric machine control system according to the first aspect of the invention, the control switching threshold may be a control switching modulation degree that is used for switching the control mode of the rotary electric machine from the over-modulation control mode to a sine-wave pulse width modulation (PWM) control mode, the control switching modulation degree being a value of a modulation degree that is a ratio of an effective value of a line-to-line voltage that is a voltage to be applied to the rotary electric machine to a system voltage that is a DC voltage of an inverter; and the threshold changing unit may be configured to change the control switching modulation degree to be used for switching the control mode of the rotary electric machine from the over-modulation control mode to the sine-wave PWM control mode, in accordance with the measurement result of the number of revolutions.

In the rotary electric machine control system according to the first aspect of the invention, the threshold changing unit may be configured to change the control switching modulation degree to a sudden-change switching modulation degree that is larger than an initial switching modulation degree, in accordance with a variation in the number of revolutions when the measured number of revolutions has decreased by a preset grip value or more; and the threshold changing unit may be configured to set the control switching modulation degree to the initial switching modulation degree when the measured number of revolutions has not decreased by the preset grip value or more.

A rotary electric machine control method according to a second aspect of the invention includes: measuring the number of revolutions per predetermined time period of a rotary electric machine; and changing a control switching threshold to be used for switching a control mode of the rotary electric machine, in accordance with a measurement result of the number of revolutions.

In the rotary electric machine control method according to the second aspect of the invention, the control switching threshold may be a control switching phase on a d-q plane having a d-axis and a y-axis intersecting orthogonally with each other, on which an operating point of the rotary electric machine moves, wherein the control switching phase is used for switching the control mode of the rotary electric machine from a rectangular-wave control mode to an over-modulation control mode; and, when the control switching threshold is changed, the control switching phase to be used for switching the control mode of the rotary electric machine from the rectangular-wave control mode to the over-modulation control mode may be changed in accordance with the measurement result of the number of revolutions.

The rotary electric machine control method according to the second aspect of the invention may further include: changing the control switching phase to a sudden-change switching phase that is on a smaller angle side of a current command line drawn by connecting current commands when operation of the rotary electric machine is instructed by current control, and on a larger angle side of an initial switching phase, in accordance with a variation in the number of revolutions when the measured number of revolutions has decreased by a preset grip value or more; and setting the control switching phase to the initial switching phase when the measured number of revolutions has not decreased by the preset grip value or more.

In the rotary electric machine control method according to the second aspect of the invention, the control switching threshold may be a control switching modulation degree that is used for switching the control mode of the rotary electric machine from the over-modulation control mode to a sine-wave pulse width modulation (PWM) control mode, the control switching modulation degree being a value of a modulation degree that is a ratio of an effective value of a line-to-line voltage that is a voltage to be applied to the rotary electric machine to a system voltage that is a DC voltage of an inverter; and, when the control switching threshold is changed, the control switching modulation degree to be used for switching the control mode of the rotary electric machine from the over-modulation control mode to the sine-wave PWM control mode may be changed in accordance with the measurement result of the number of revolutions.

The rotary electric machine control method according to the second aspect of the invention may further include: changing the control switching modulation degree to a sudden-change switching modulation degree that is larger than an initial switching modulation degree, in accordance with a variation in the number of revolutions when the measured number of revolutions has decreased by a preset grip value or more; and setting the control switching modulation degree to the initial switching modulation degree when the measured number of revolutions has not decreased by the preset grip value or more.

With the rotary electric machine control system and the rotary electric machine control method according to the invention, it is possible to switch the control mode rapidly, when the number of revolutions of the rotary electric machine suddenly drop, by causing a threshold changing unit to change a control switching threshold to the side where the switching is performed earlier than normal. Thus, it is made possible to effectively prevent overcurrent from flowing through the rotary electric machine by reducing a voltage applied to the rotary electric machine earlier than normal.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Exemplary embodiments of the invention will be described in detail below with reference to the accompanying drawings. Although the following description will be made on the assumption that a rotary electric machine is a motor generator mounted on a vehicle, the invention is not limited to this and is applicable to other rotary electric machines not for vehicle use. Further, the rotary electric machine may be one that functions only as a motor and is used in an electric automobile or fuel-cell electric vehicle. Further, although the following description of transition state of a vehicle will be made in terms of transition from a slip state to a grip state, the invention is not limited to this and is applicable to other cases as long as the number of revolutions of the rotary electric machine suddenly changes, requiring rapid switching of the control mode of the rotary electric machine. For example, the invention can be applicable also when the vehicle speed suddenly drops for a reason other than grip.

Figure 1:
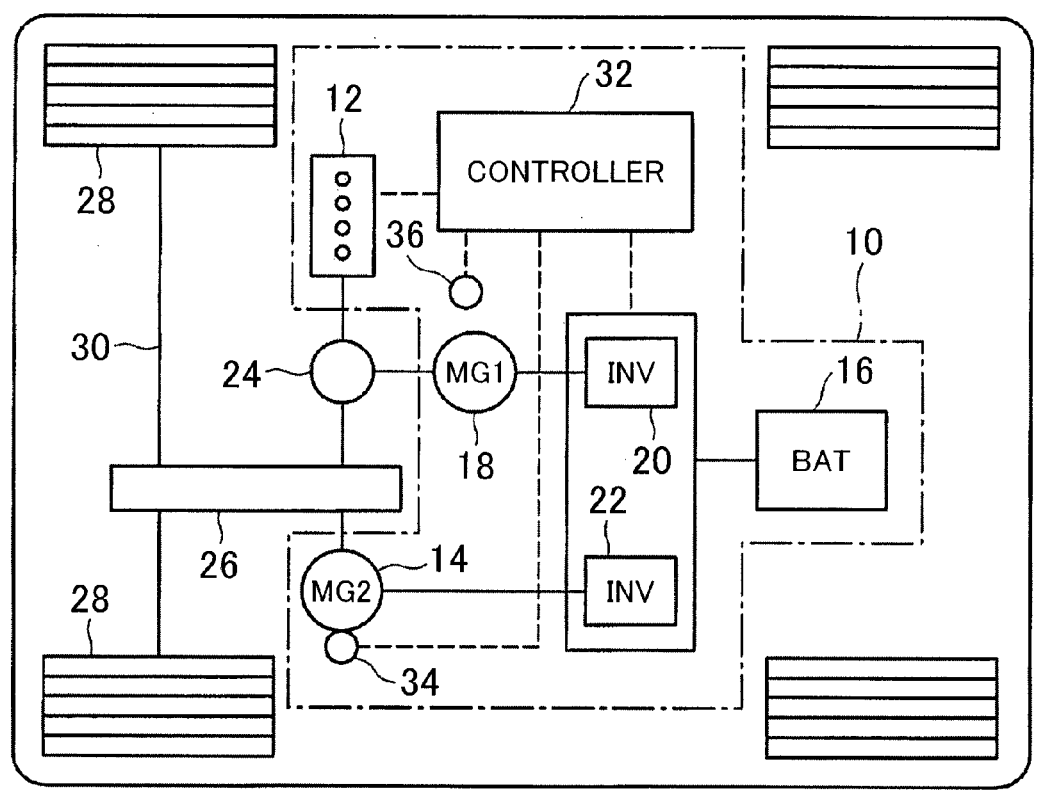
FIG. 1 is a diagram showing a configuration of a vehicle having a rotary electric machine control system according to a first embodiment of the invention mounted thereon.

Herein, like elements are assigned with like reference numerals in all the drawings, and redundant description thereof will be omitted. In the description below, the same reference numerals used before will be used if necessary.
First Embodiment FIG. 1 is a diagram showing a configuration of a vehicle having a rotary electric machine control system 10 mounted thereon. This vehicle is a hybrid vehicle that is designed to use, as its traction power source, either one or both of an engine 12 and a second motor generator (MG2) 14 that is a traction motor.

The vehicle has an engine 12, a battery 16, a first motor generator (MG1) 18 and a second motor generator (MG2) 14. The vehicle further has a first inverter 20 connected between the battery 16 and the first motor generator 18, and a second inverter 22 connected between the battery 16 and the second motor generator 14. The vehicle also has a power distributing mechanism 24 for distributing power among the engine 12 and the motor generators 14, 18, a transmission 26 provided between the power distributing mechanism 24 and the second motor generator 14, and an axle 30 for receiving power from the transmission 26 and transmitting the received power to wheels 28. The vehicle has a rotary electric machine control system 10, which includes the engine 12, the motor generators 14, 18, the inverters 20, 22, the battery 16, and a controller 32.

The motor generators 14, 18 are three-phase synchronous type rotary electric machines, each of which functions as a motor when supplied with power from the battery 16, and functions as an electric generator when driven by the engine 12 or when the vehicle is braked. While the first motor generator 18 is principally used as an electric generator driven by the engine 12, it is sometimes used as a motor. Generated power is supplied to the battery 16 via the first inverter 20. A converter for performing voltage conversion can be connected between the battery 16 and the first inverter 20. While the second motor generator 14 is principally used as a motor, it is sometimes used as an electric generator.

Each of the inverters 20, 22 includes a plurality of switching elements such as transistors, or IGBTs, and the switching is controlled by the controller 32. The inverters 20, 22 convert a direct current (DC) voltage supplied from the battery 16 to a three-phase alternating current (AC) voltage, and outputs the three-phase AC voltage to a corresponding motor generator 18, (or motor generator 14). When the vehicle is braked, the three-phase AC voltage that is output from the second motor generator 14 to the second inverter 22 is converted to a DC voltage by the second inverter 22, and this DC voltage is supplied to the battery 16 to charge the battery 16. The first motor generator 18 is driven by the engine 12, whereby the three-phase AC voltage output by the first motor generator 18 is converted to a DC voltage by the first inverter 20, and this DC voltage is supplied to the battery 16 to charge the battery 16.

The controller 32 controls operation of various elements including the inverters 20, 22 and the engine 12. The controller 32 may be constituted, for example, of an in-vehicle computer. While the controller 32 can be constituted of a single computer, it can also be constituted by connecting a plurality of computers with cables or the like. For example, the controller 32 can be divided into a motor controller for controlling operation of the motor generators 14, 18, an engine controller for controlling operation of the engine 12, and an integrated controller for controlling the entire operations in an integrated manner. The rotary electric machine control system 10 is provided with number-of-revolutions sensors 34, 36 that are devices for measuring the numbers of revolutions per predetermined period of time of the motor generators 14, 18, respectively. The predetermined period of time may be 10 msec, for example. Detection values of the number-of-revolutions sensors 34, 36 are input to the controller 32. Instead of the number-of-revolutions sensors 34, 36, rotational angle sensors may be provided for detecting rotational angles of the motor generators 14, 18 may be provided so that detection values of the rotational angle sensors are input to the controller 32. In this case, the controller 32 may further be provided with a number-ofrevolutions calculation unit that calculates the number of revolutions per predetermined time period of each of the motor generators 14, 18 based on the detection values of the rotational angle sensors, and the number-of-revolutions measuring device can be composed of this number-of-revolutions calculation unit and rotational angle sensors.

Figure 2:
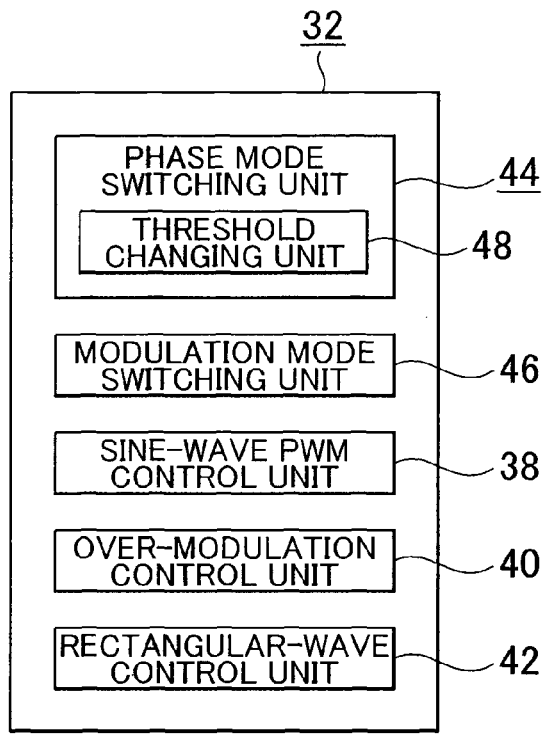
FIG. 2 is a block diagram showing a configuration of a controller shown in FIG. 1.

FIG. 2 shows functional sections of part of the controller 32, which part controls the motor. Specifically, the controller 32 includes a sine-wave PWM control unit 38, an over-modulation control unit 40, a rectangular-wave control unit 42, a phase mode switching unit 44, and a modulation mode switching unit 46. Although the controller 32 controls both of the motor generators 14, 18 (see FIG. 1), the following description will be made, for the sake of simplification, in terms of the case in which the controller 32 controls the second motor generator 14 (hereafter, sometimes simply referred to as the "rotary electric machine 14"). The control of the second motor generator 14 described below can be applied to control of both of the second motor generator 14 and the first motor generator 18, as well as to control of only the first motor generator 18.

The sine-wave PWM control unit 38 controls the rotary electric machine 14 by means of sine-wave PWM control. The over-modulation control unit 40 controls the rotary electric machine 14 by means of over-modulation control. The rectangular-wave control unit 42 controls the rotary electric machine 14 by means of rectangular-wave control.

Figures 4, 5:
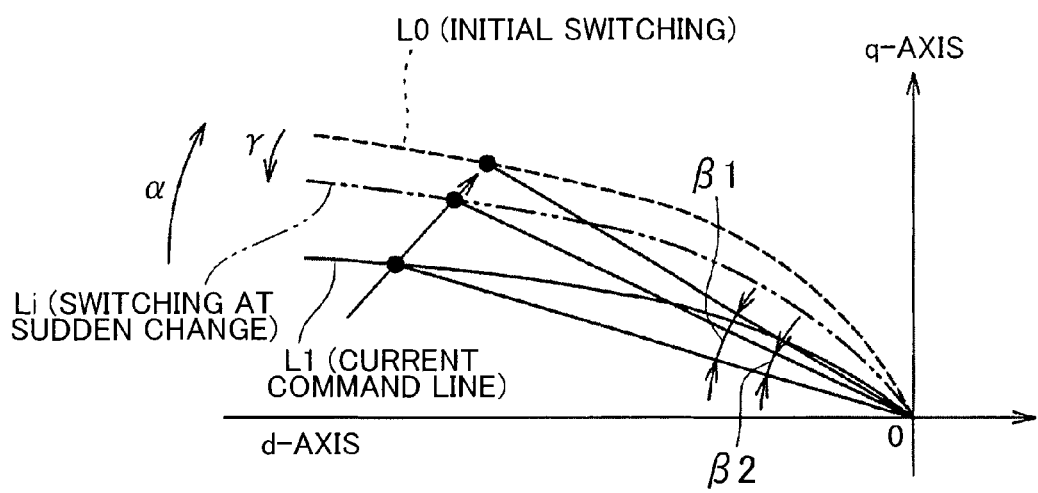
FIG. 4 is a diagram showing a current command line, an initial switching line, and a sudden-change switching line on a d-q plane in the case of the first embodiment.
FIG. 5 is a diagram showing relationship between variation in the number of revolutions of the rotary electric machine and control switching phase stored in the controller in the case of the first embodiment.

The phase mode switching unit 44 switches the control method, or the control mode for controlling the rotary electric machine 14 from the rectangular-wave control mode to the over-modulation control mode, based on an operating point of the rotary electric machine 14 on the d-q plane. The d-q plane as used here is for defining an operating point of the rotary electric machine 14 by the d-axis and the q-axis intersecting orthogonally with each other as shown in FIG. 4 to be described later. For example, the d-axis may be a d-axis current axis (Id-axis) or d-axis voltage axis (Vd-axis), while the q-axis may be a q-axis current axis (Iq-axis) or q-axis voltage axis (Vd-axis) intersecting orthogonally with the Id-axis or the Vd-axis. In addition, the controller 32 defines, as a current command line L1 on the d-q plane, a maximum efficiency characteristic line drawn by connecting a set of currents consisting of d-axis current and q-axis current that enable operation at a maximum efficiency when the rotary electric machine 14 is current-controlled.

The phase mode switching unit 44 has a function of switching from the rectangular-wave control mode to the over-modulation control mode when the operating point of the rotary electric machine 14 goes beyond, in a maximum voltage circle (not shown) centered at the origin O on the d-q plane, an initial switching line L0 having an initial switching phase difference β1 (see FIG. 4) that is preset on the direction indicated by the arrow α in FIG. 4, that is, on the smaller angle side of the current command line L1.

The modulation mode switching unit 46 switches the control mode among the sine-wave PWM control mode, the over-modulation control mode and the rectangular-wave control mode based on a modulation degree E. The modulation degree (=modulation factor) E is a ratio (J/VH) of an effective value J of line-to-line voltage that is voltage applied to the rotary electric machine 14 to system voltage VH that is DC voltage of the inverter 22. The effective value J of line-to-line voltage of the rotary electric machine 14 can be obtained by the formula: $J=\{(Vd^*)^2+(Vq^*)^2\}^{1/2}$ using a d-axis voltage command value Vd* and a q-axis voltage command value Vq*. Therefore, the modulation degree E can be obtained by the formula: the modulation degree $E=[\{(Vd^*)^2+(Vq^*)^2\}^{1/2}]/VH$. The PWM control mode is executed until the modulation degree E becomes 0.61, and once the modulation degree E exceeds 0.61, the control mode is switched to the over-modulation control mode. When the modulation degree E reaches 0.78, the rectangular-wave control mode is employed.

The PWM control mode and the over-modulation control mode are current feedback control, in which a PWM signal is output to the rotary electric machine 14 by comparing a voltage command value and a carrier. On the other hand, the rectangular-wave control mode is a control in which a one-pulse switching waveform according to an electrical angle is output to the rotary electric machine 14. In this control, the voltage amplitude is fixed to a maximum value and the torque is feedback-controlled by controlling the phase.

Figure 3:
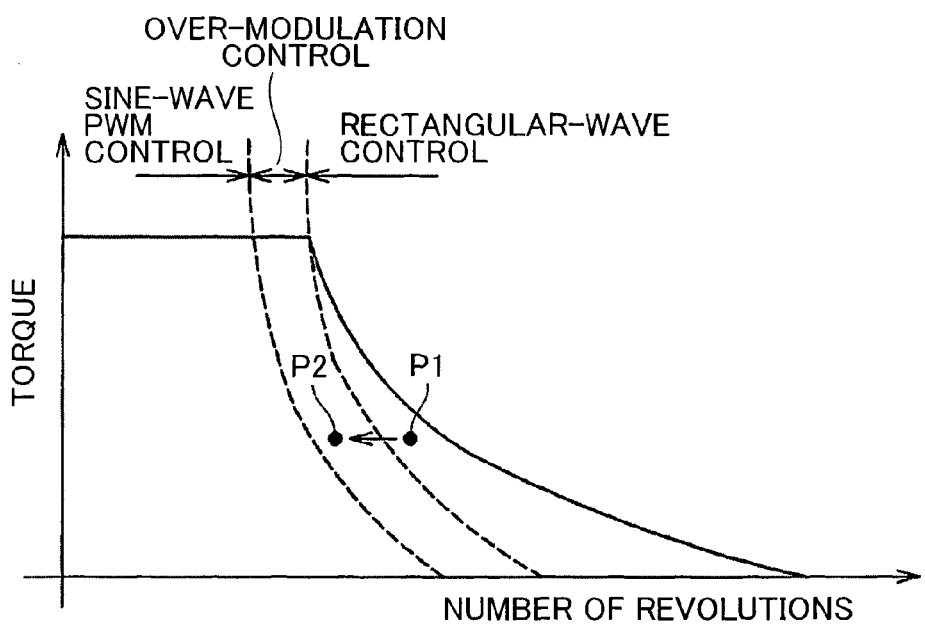
FIG. 3 is a diagram for explaining switching of control modes of the rotary electric machine according to the first embodiment, showing relationship between torque and number of revolutions of the rotary electric machine.

FIG. 3 is a diagram for explaining how the control mode is selected according to the operating point of the rotary electric machine 14. In this diagram, the abscissa axis indicates the number of revolutions of the rotary electric machine 14 while the ordinate axis indicates the torque, and the maximum torque characteristic line is shown. The diagram shows which control mode is employed in each operating region in the inside of the maximum torque characteristic line. As shown in FIG. 3, the operating region of the sine-wave PWM control mode is set on the lower speed side, the operating region of the rectangular-wave control mode is set on the higher speed side, and the operating region of the over-modulation control mode is set in between them.

Next, description will be made of switching among these three control modes. As shown in FIG. 3, the control mode is switched in accordance with a state of the operating point of the rotary electric machine 14 that is determined by the number of revolutions and the torque. As the speed and torque are gradually increased, the control mode is switched over from the sine-wave PWM control mode to the over-modulation control mode, and then from the over-modulation control mode to the rectangular-wave control mode. In this case, the control mode can be switched according to the modulation degree E as described below. Specifically, the sine-wave PWM control mode is employed when the modulation degree E is 0.61 or less, the over-modulation control mode is employed when the modulation degree E is from 0.61 to 0.78, and the control mode is switched to the rectangular-wave control mode when the modulation degree E reaches 0.78.

When the control mode is switched in the reverse sequence to that described above, the modulation degree E can be used as well. However, as in the case of transition from the point P1 to the point P2 in FIG. 3, the switching from the rectangular-wave control mode to the over-modulation control mode is performed by determining a switching timing based on a phase of actual current to a current command, for example, because the amplitude of a voltage command is fixed in the rectangular-wave control mode.

FIG. 4 is a diagram for explaining switching lines for switching from the rectangular-wave control mode to the over-modulation control mode. These switching lines here are shown on a d-q plane defined by the d-axis and the q-axis used in vector control of the rotary electric machine 14. In the vector control used for three-phase synchronous type rotary electric machines, a direction of magnetic flux generated by the magnetic pole of a rotor is defined as d-axis, and an axis orthogonal to the d-axis is defined as q-axis.

When d-axis current is denoted by Id and q-axis current is denoted by Iq, an absolute value Ia of the current vector is represented by the formula: $Ia=(Id^2+Iq^2)^{1/2}$, while the current phase $\beta$ is represented by the formula: $\beta=\tan^{-1}(Iq/Id)$. In this case, the torque $\tau$ is obtained by the formula: $\tau=p\psi Ia\times\sin\beta+(1/2)\times p(Ld-Lq)Ia^2\times\sin 2\beta$. In this formula, p denotes the number of poles of the rotary electric machine 14, $\psi$ denotes a counter electromotive force constant, and Ld and Lq respectively denote a d-axis inductance and a q-axis inductance. Therefore, the torque $\tau$ can be controlled by the current phase $\beta$ that is a phase between the d-axis current component and the q-axis current component.

The current phase $\beta$ providing a maximum torque can be obtained by the formula: $\beta=\cos^{-1}\{[-\psi+\{\psi^2-8(Ld-Lq)^2\}^{1/2}]/4(Ld-Lq)Ia\}$. The maximum efficiency characteristic line on which the rotary electric machine 14 can be operated with a maximum efficiency can be obtained by making, if required, appropriate corrections to the relational formula obtained by this calculation.

In this embodiment, this maximum efficiency characteristic line is set to the current command line L1, and switching lines L0, Li are set on the smaller angle side of the current command line L1. The reason why the switching lines L0, Li are set on the smaller angle side of the current command line L1 is that if the switching lines L0, Li are set on the larger angle side of the current command line L1 or to the same phase, chattering in control can occur during mode switching, resulting in disturbance in current. Specifically, if the rotary electric machine 14 is shifted to a low speed direction during rectangular-wave control, the current phase of the rotary electric machine 14 will move, on the maximum voltage circle, from the larger angle side to the smaller angle side toward the current command line L1. Once the current phase goes beyond the current command line L1 and reaches the switching line L0 (or Li), the control mode is switched from the rectangular-wave control mode to the over-modulation control mode. The current command line L1 is a line drawn by connecting current commands when operation of the rotary electric machine 14 is instructed by means of current control. The current command line L1 may be set to a line other than the maximum efficiency characteristic line.

When the rotary electric machine 14 is activated and the speed is increased from a low-speed and low-torque state so that the torque and the number of revolutions are increased, a current command is executed on the current command line L1 with use of the sine-wave PWM control. In a medium-speed range, the control mode is switched over to the over-modulation control by the modulation degree exceeding 0.61 or a higher voltage side modulation degree that is set in advance to 0.6 or more, and a current command is executed on the current command line L1 with use of the over-modulation control. When the speed and torque are further increased and the modulation degree reaches 0.78, the control mode is switched to the rectangular-wave control mode. In this case, the torque is controlled by voltage phase angles on a maximum voltage circle (not shown) centered at the origin O. For example, the torque is controlled so that the voltage phase moves away from the current command line to the larger angle side (to the side opposite to the direction indicated by the arrow α in FIG. 4). This means that, in this case, the torque is controlled by rectangular-wave control that is voltage phase control. In the rectangular-wave control, the torque may also be controlled by the phase being changed with the operating point being moved out of the maximum voltage circle.

In this first embodiment, in particular, the phase mode switching unit 44 has a threshold changing unit 48 as shown in FIG. 2. The threshold changing unit 48 changes the control switching phase as a control switching threshold that is used for switching the control mode of the rotary electric machine 14 in accordance with a measurement result of the number of revolutions per predetermined time period measured by a number-of-revolutions measuring device such as the number-of-revolutions sensor 34. The term "control switching phase" as used herein means a phase angle formed on the control switching lines L0, Li on the smaller angle side with respect to the current command line L1 on the d-q plane of FIG. 4. The control switching lines L0, Li are used for switching the control mode of the rotary electric machine 14 from the rectangular-wave control mode to the over-modulation control mode. For example, when the number of revolutions per predetermined time period of the rotary electric machine 14 rapidly drops, such as when the vehicle shifts from a slip state to a grip state, the threshold changing unit 48 changes the switching line from the preset initial switching line L0 to the sudden-change switching line Li as indicated by the arrow γ in FIG. 4 if the number of revolutions per predetermined time period of the rotary electric machine 14 measured by number-of-revolutions measuring device is decreased by a preset grip value (value indicating that wheels have gripped) or more. The initial switching line L0 has an initial switching phase $\beta 1$ on the smaller angle side with respect to the current command line L1. The sudden-change switching line Li has a sudden-change switching phase $\beta 2$ on the smaller angle side with respect to the current command line L1. The sudden-change switching line Li is set to the smaller angle side of the current command line L1 but to the larger angle side of the initial switching line L0.

Such sudden-change switching line Li can be set in plurality according to variations of the number of revolutions per predetermined time period of the rotary electric machine 14. Specifically, when the measured number of revolutions of the rotary electric machine 14 has decreased by the preset grip value or more, the threshold changing unit 48 changes the control switching line, according a variation in the number of revolutions of the rotary electric machine 14, to a sudden-change switching line Li that is on the smaller angle side of the current command line L1 and on the larger angle side of the initial switching line L0. Therefore, the control switching phase of the control switching line is switched to the sudden-change switching phase $\beta 2$ according to the variation in the number of revolutions of the rotary electric machine 14.

When the measured number of revolutions of the rotary electric machine 14 has not decreased by the preset grip value or more, the threshold changing unit 48 sets the control switching line to the initial switching line L0. This means that the control switching phase is set to the initial switching phase $\beta 1$.

FIG. 5 is a diagram showing relationship between control switching phase and variation in the number of revolutions of the rotary electric machine 14 stored in a storage unit of the controller 32 according to the first embodiment. In FIG. 5, the "variation in the number of revolutions" means a variation in the number of revolutions per predetermined time period of the rotary electric machine 14 during the rectangular-wave control. The "switching phase" is a phase on the smaller angle side of the control switching line with respect to the current command line L1, corresponding to the variation in the number of revolutions. Specifically, the phase a° corresponds to the initial switching phase $\beta 1$ (FIG. 4), and the phases b°, c°, d° correspond to the sudden-change switching phase $\beta 2$ (FIG. 4). The values of a to d are set such that a>b>c>d. FIG. 5 shows an example of the relationship between variation in the number of revolutions and switching phase only for illustrative purposes, and another example may be employed.

Figure 6:
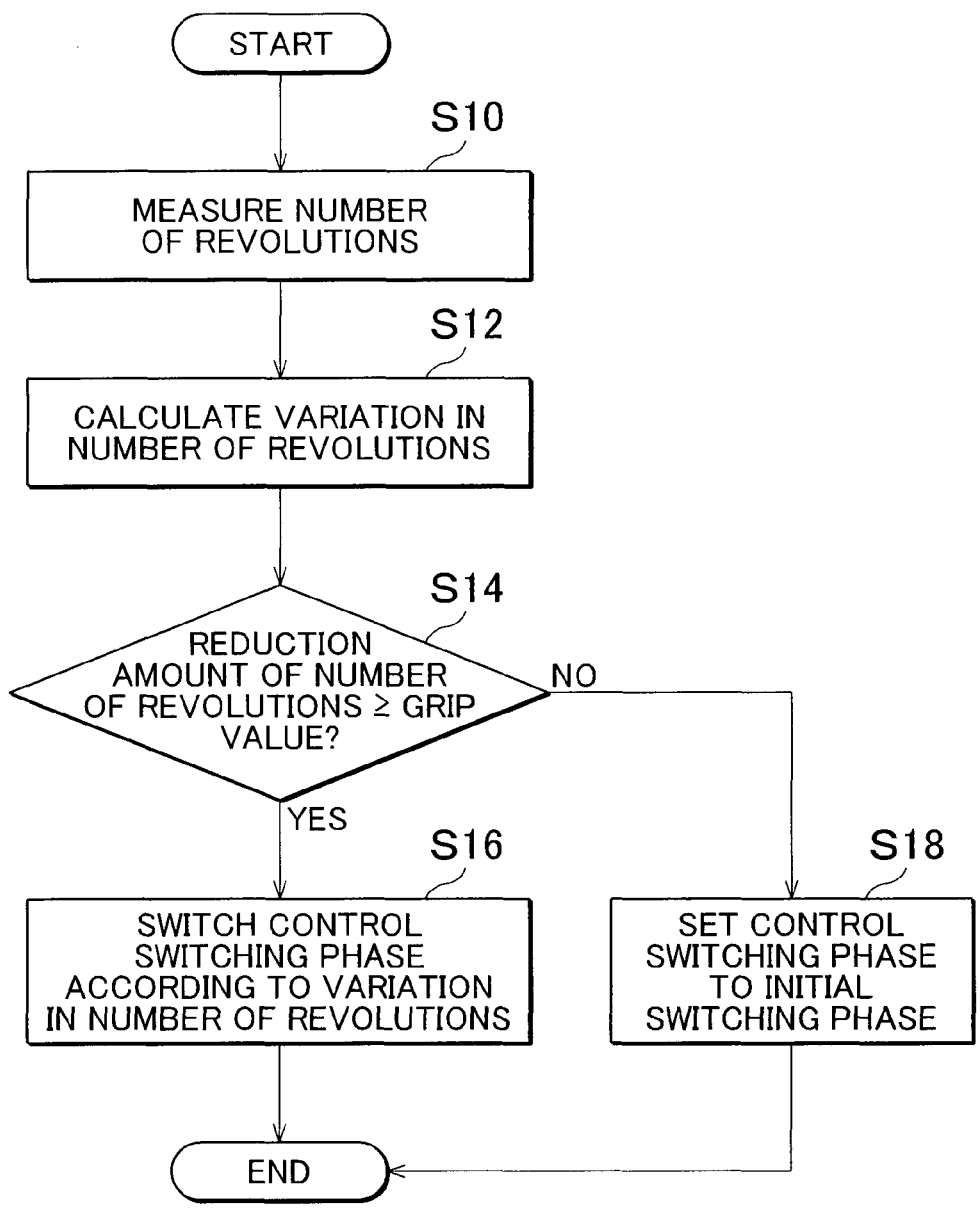
FIG. 6 is a flow chart showing a switching method of control mode of the rotary electric machine according to the first embodiment.

FIG. 6 is a flowchart showing a method of switching the control mode of the rotary electric machine 14 according to this embodiment. Firstly, in step S (hereafter, step S is abbreviated as S) 10, a number-of-revolutions measurement unit measures the number of revolutions per predetermined time period of the rotary electric machine 14. Subsequently, a variation in the number of revolutions per predetermined time period is calculated (S12). When the calculated number of revolutions has decreased by a preset grip value or more in S14 (for example, in FIG. 5, the absolute value of the variation in the number of revolutions per predetermined time period is 50 or more), the method proceeds to S16.

In S16, the control switching line is changed to one of a plurality of sudden-change switching lines Li in accordance with the variation in the number of revolutions of the rotary electric machine 14. Therefore, the control switching phase of the control switching line is switched to a corresponding sudden-change switching phase β2 in accordance with the variation in the number of revolutions. In this case, map data representing the aforementioned relationship between variations of the number of revolutions and switching phase shown in FIG. 5 is stored in advance in the controller 32, and the controller 32 changes the control switching line with reference to this map data.

In contrast, if the calculated number of revolutions has not decreased by the preset grip value or more in S14 (for example, in FIG. 5, the absolute value of the variation in the number of revolutions per predetermined time period is 50 or more), the method proceeds to S18. In S18, the control switching line is set to the initial switching line L0. Therefore, the control switching phase is set to the initial switching phase β1, that is, a default value.

With such a rotary electric machine control system 10 as described above, it is possible to rapidly switch the control mode at the time of sudden decrease in the number of revolutions of the rotary electric machine 14, by causing the threshold changing unit 48 to change the control switching threshold to the side where earlier switching is allowed when the number of revolutions of the rotary electric machine 14 drops rapidly. Thus, it is possible to effectively suppress overcurrent flowing through the rotary electric machine 14 by reducing the voltage to be applied to the rotary electric machine 14 earlier than normal when the number of revolutions of the rotary electric machine 14 is decreased rapidly, such as when the vehicle having the rotary electric machine 14 mounted thereon shifts from a slip state to a grip state.

Moreover, the threshold changing unit 48 changes the control switching phase that is used for switching the control mode of the rotary electric machine 14 from the rectangular-wave control mode to the over-modulation control mode in accordance with a measurement result of the number of revolutions of the rotary electric machine 14. When the measured number of revolutions has decreased by the preset grip value or more, the threshold changing unit 48 changes, according to the variation in the number of revolutions, the control switching phase to the sudden-change switching phase (32 of the sudden-change switching line Li that is on the smaller angle side of the current command line L1 and on the larger angle side of the initial switching line L0 having the initial switching phase β1. When the measured number of revolutions has not decreased by the preset grip value or more, the threshold changing unit 48 sets the control switching phase to the initial switching phase β1. In other words, in accordance with a variation in the number of revolutions of the rotary electric machine 14, the phase difference β1 between the current command line L1 and the initial switching line L0 that corresponds to a hysteresis width for preventing chattering in control is switched over to the phase difference β2 between the current command line L1 and the sudden-change switching line Li so as to reduce the control switching phase when the number of revolutions drops rapidly. This provides the same effect as reducing the hysteresis width. As a result, when the number of revolutions of the rotary electric machine 14 rapidly drops during execution of the rectangular-wave control mode, the voltage applied to the rotary electric machine 14 can be reduced earlier than normal, and overcurrent flowing through the rotary electric machine 14 can be effectively suppressed.

In the foregoing description, it is determined whether or not the control switching phase is to be changed depending on whether or not a reduction amount of the number of revolutions per predetermined time period of the rotary electric machine 14 becomes the grip value or more. However, it is also possible to employ occurrence of a slip in place of occurrence of a grip as a condition for changing the control switching phase. Specifically, it may be determined that a slip of the vehicle has occurred when the number of revolutions per predetermined time period of the rotary electric machine 14 has rapidly increased to a predetermined value or more, and the control switching phase can be changed accordingly. The reason why the detection of a slip can be used in place of the detection of a grip is that a grip invariably occurs following occurrence of a slip. Therefore, the occurrence of a slip or the occurrence of a grip can be determined by using an absolute value of the variation in the number of revolutions instead of using a reduction amount of the number of revolutions.

Further, instead of changing the phase difference between the initial switching line L0 and the control switching line corresponding to the hysteresis width in accordance with the variation in the number of revolutions of the rotary electric machine 14 as described above, the threshold changing unit 48 may be configured such that when a sudden change occurs in torque, current, or the voltage to be applied to the rotary electric machine 14, the phase difference between the initial switching line L0 and the control switching line is changed according to the variation in the torque, current or voltage. This is because change in voltage or sudden change in torque or current occurs when the vehicle is brought into a grip state or a slip state.

Further, it is also possible to switch the control switching phase in accordance with a variation in the number of revolutions or the like exclusively for a high torque range in which sudden switching of the control mode from the rectangular-wave control mode to the over-modulation control mode might lead to increase of current.

Furthermore, instead of retrieving a control switching phase from the map data, a corresponding control switching phase can be calculated based on a variation in the number of revolutions by using a relational expression (for example, a relational expression using proportion) stored in advance in the controller 32.

Second Embodiment

Figure 7:
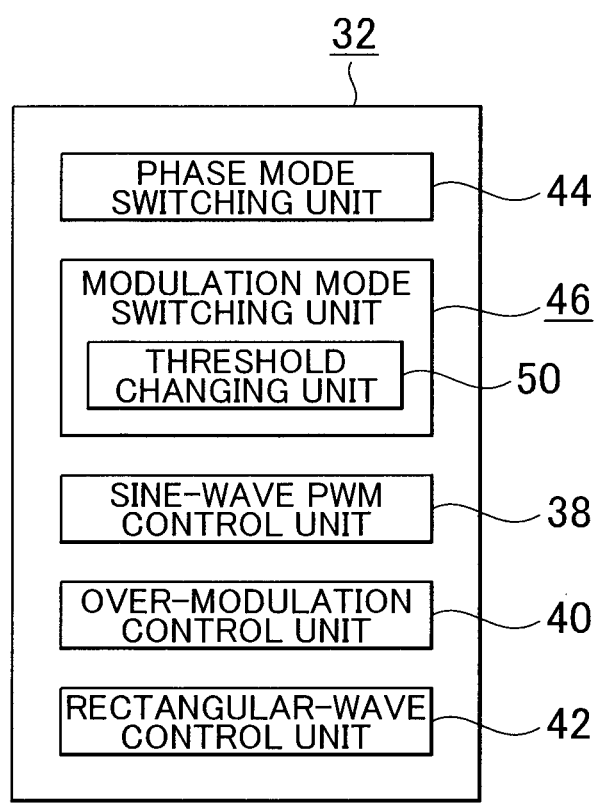
FIG. 7 is a block diagram showing a configuration of a controller as a constituent of a rotary electric machine control system according to a second embodiment of the invention.
Figure 8:
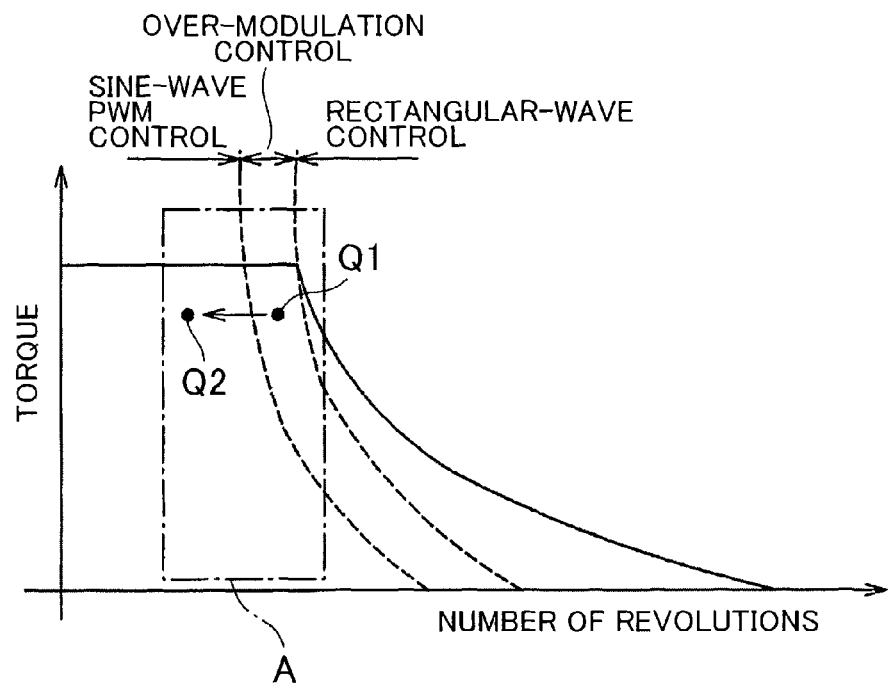
FIG. 8 is a diagram for explaining switching of control mode of the rotary electric machine according to the second embodiment, showing relationship between torque and number of revolutions of the rotary electric machine.
Figure 9:
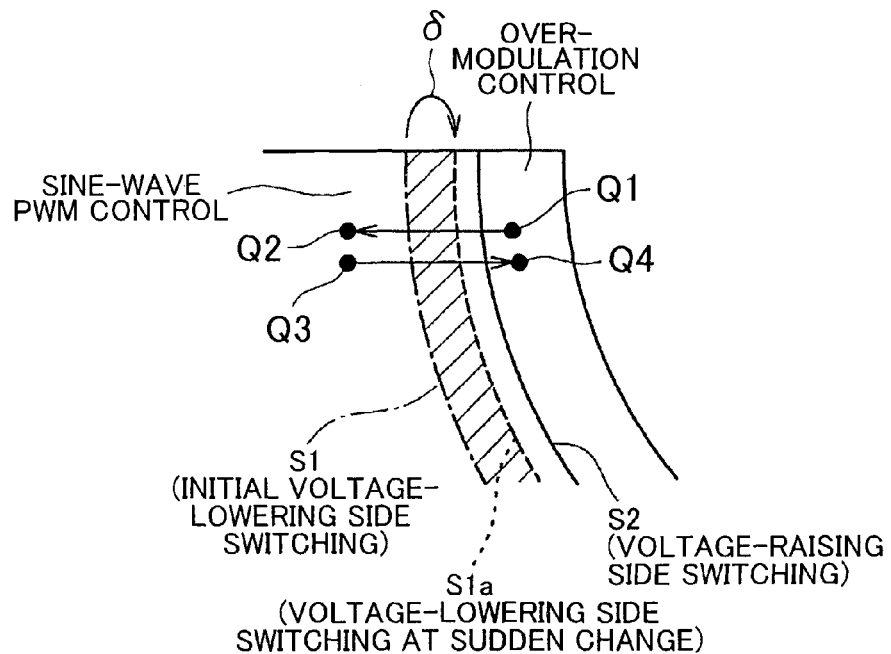
FIG. 9 is a diagram showing a section A in FIG. 8 in an enlarged manner.

FIGS. 7 to 12 show a second embodiment of the invention. FIG. 7 is a block diagram showing a configuration of a controller 32, which is part of a rotary electric machine control system 10 (FIG. 1) according to the second embodiment. FIG. 8 is a diagram for explaining switching of a control mode of the rotary electric machine in the rotary electric machine control system 10 according to the second embodiment, and showing relationship between torque and the number of revolutions of the rotary electric machine. FIG. 9 is a diagram showing a section A of FIG. 8 in an enlarged manner. While the following description will be made, like the description of the first embodiment, in terms of a case in which a second motor generator 14 (hereafter, sometimes simply referred to as the "rotary electric machine 14") (FIG. 1) is controlled, the control of the second motor generator 14 described below is applicable to control of both of the second motor generator 14 and the first motor generator 18 (FIG. 1) and to control of the first motor generator 18 only.

The description of the first embodiment has been made of a configuration in which the rectangular-wave control is switched over to the over-modulation control earlier than normal in order to eliminate the problems that may occur when the number of revolutions of the rotary electric machine 14 is suddenly changed when the rotary electric machine 14 is controlled by the rectangular-wave control. However, these problems may also occur when the number of revolutions of the rotary electric machine 14 is suddenly changed when the rotary electric machine 14 is controlled by the over-modulation control and the vehicle shifts from a slip state to a grip state. This second embodiment has been devised in order to solve such problems.

Specifically, in the controller 32 according to the second embodiment, the phase mode switching unit 44 for switching the control mode of the rotary electric machine 14 from the rectangular-wave control mode to the over-modulation control mode does not have the threshold changing unit 48 (FIG. 2). Instead, the modulation mode switching unit 46 for switching the control mode of the rotary electric machine 14 from the over-modulation control mode to the sine-wave PWM control mode has a threshold changing unit 50. The threshold changing unit 50 has a function of changing switching modulation degrees E0, Ei (FIG. 10) used for switching the control mode in accordance with a measurement result of the number of revolutions per predetermined time period of the rotary electric machine 14.

As shown in FIG. 8 and FIG. 9, in view of the operating point of the rotary electric machine 14 defined by the number of revolutions and torque, transition from the over-modulation control mode to the sine-wave PWM control mode is caused by reduction of the number of revolutions or torque of the rotary electric machine 14, which is represented by, for example, the shift of the operating point from a point Q1 to a point Q2 in FIG. 8 and FIG. 9. In this case, the control mode is normally switched from the over-modulation control mode to the sine-wave PWM control mode at an initial voltage-lowering side switching line indicated by the dash-dot line S1 in FIG. 9. The switching from the sine-wave PWM control mode to the over-modulation control mode as represented by, for example, the shift from a point Q3 to a point Q4 shown in FIG. 9 is carried out at a voltage-raising side switching line (solid line S2 in FIG. 8) that is set on the higher voltage side of the initial voltage-lowering side switching line S1, that is, on the right side thereof in FIG. 9. This voltage-raising side switching line corresponds to a modulation degree Ea that is higher than 0.61.

Figures 10, 11:
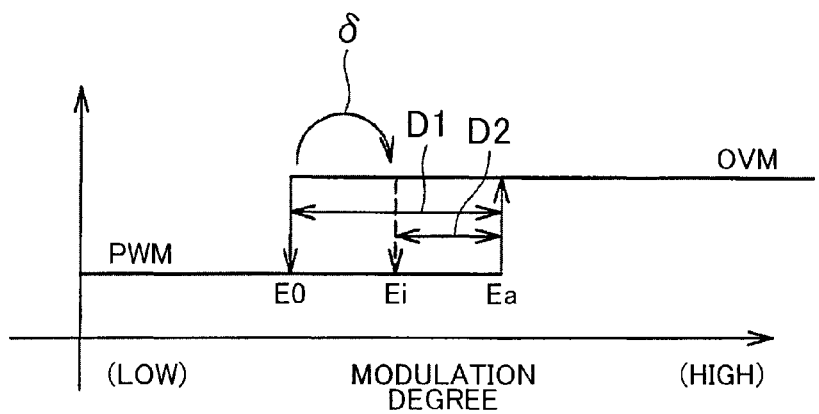
FIG. 10 is diagram showing a voltage-raising side switching modulation degree Ea used for switching from sine-wave PWM control mode (PWM) to over-modulation control mode (OVM), an initial voltage-lowering side switching modulation degree E0 used for switching from over-modulation control mode to sine-wave PWM control mode, and a sudden-change voltage-lowering side switching modulation degree Ei in the case of the second embodiment.
FIG. 11 is a diagram showing relationship between variation in the number of revolutions of the rotary electric machine and control switching modulation degree stored in the controller in the case of the second embodiment.

This will be described in more detail with reference to FIG. 10. FIG. 10 is a diagram showing, in the second embodiment, a voltage-raising side switching modulation degree Ea used for switching from the sine-wave PWM control mode (PWM) to the over-modulation control mode (OVM), an initial voltage-lowering side switching modulation degree E0 used for switching from the over-modulation control mode to the sine-wave PWM control mode, and a sudden-change voltage-lowering side switching modulation degree Ei. In FIG. 10, directions of the arrows indicate directions of switching of the control modes. All these modulation degrees Ea, E0, and Ei are larger than 0.61 that is the upper limit of the modulation degree of the sine-wave PWM control. The initial voltage-lowering side switching modulation degree E0 is smaller than the voltage-raising side switching modulation degree Ea.

The reason why the initial voltage-lowering side switching modulation degree E0 is set to be smaller than the voltage-raising side switching modulation degree Ea is that if the initial voltage-lowering side switching modulation degree E0 is set to be larger than or to be the same as the voltage-raising side switching modulation degree Ea, chattering in control can occur during switching of the control mode, which can cause disturbance in current. Specifically, when the rotary electric machine 14 is shifted to a lower speed state during over-modulation control, the modulation degree of the rotary electric machine 14 decreases. When the modulation degree goes beyond the voltage-raising side switching modulation degree Ea and reaches the initial voltage-lowering side switching modulation degree E0, the control mode is switched from the over-modulation control mode to the sine-wave PWM control mode.

When the rotary electric machine 14 is activated, and the speed, torque and the number of revolutions are increased from a low-speed and low-torque state, a current command is executed in a low-speed range with use of the sine-wave PWM control. In a medium-speed range, when the modulation degree goes beyond the modulation degree Ea that is larger than 0.61, the sine-wave PWM control is switched over to the over-modulation control, and a current command is executed with use of the over-modulation control. When the speed and torque are further increased and the modulation degree reaches 0.78, the control mode is switched to the rectangular-wave control mode as described in the second embodiment above.

In the second embodiment, as described above, the modulation mode switching unit 46 has the threshold changing unit 50. The threshold changing unit 50 changes the voltage-lowering side switching modulation degrees E0, Ei that are control switching modulation degrees and serve as the control switching thresholds used for switching the control mode of the rotary electric machine 14 in accordance with a measurement result of the number of revolutions per predetermined time period by a number-of-revolutions measuring device such as the number-of-revolutions sensor 34 (see FIG. 1). The voltage-lowering side switching modulation degrees E0, Ei are control switching modulation degrees used for switching the control mode of the rotary electric machine 14 from the over-modulation control mode to the sine-wave PWM control mode. For example, when the number of revolutions per predetermined time period of the rotary electric machine 14 has suddenly decreased due to, for example, transition of the vehicle from a slip state to a grip state, if the number of revolutions per predetermined time period of the rotary electric machine 14 measured by the number-of-revolutions measuring device has decreased by the preset grip value or more, the threshold changing unit 50 changes the switching modulation degree from the initial voltage-lowering side switching modulation degree E0 to the sudden-change voltage-lowering side switching modulation degree Ei that is larger than the initial voltage-lowering side switching modulation degree E0, as indicated by the arrow δ in FIG. 9 and FIG. 10, and the voltage-lowering side switching line is switched from the initial voltage-lowering side switching line S1 to a sudden-change voltage-lowering side switching line S1a.

This sudden-change voltage-lowering side switching modulation degree Ei can be set in plurality in accordance with variations in the number of revolutions per predetermined time period of the rotary electric machine 14. Specifically, when the measured number of revolutions of the rotary electric machine 14 has decreased by a preset grip value or more, the threshold changing unit 50 changes the voltage-lowering side switching modulation degree to the sudden-change voltage-lowering side switching modulation degree Ei that is larger than the initial voltage-lowering side switching modulation degree E0 in accordance with a variation in the number of revolutions. Therefore, hysteresis widths D1, D2 (see FIG. 10), which are differences between the voltage-raising side switching modulation degree Ea and the voltage-lowering side switching modulation degrees E0, Ei, are switched in accordance with a variation in the number of revolutions.

When the measured number of revolutions has not decreased by the preset grip value or more, the threshold changing unit 50 sets the voltage-lowering side switching modulation degree to the initial voltage-lowering side switching modulation degree E0. In other words, the hysteresis width is set to the initial hysteresis width D1 that is a difference between the voltage-raising side switching modulation degree Ea and the initial voltage-lowering side switching modulation degree E0.

FIG. 11 is a diagram showing, in the second embodiment, relationship between variation in the number of revolutions of the rotary electric machine 14 and control switching modulation degree stored in the controller 32. In FIG. 11, "variation in the number of revolutions" indicates a variation in the number of revolutions per predetermined time period of the rotary electric machine 14 during the over-modulation control, and "switching modulation degree" indicates the initial voltage-lowering side switching modulation degree E0 or voltage-lowering side switching modulation degrees E1, E2, E3, E4, E5 (i.e. Ei) corresponding to the variations in the number of revolutions. The voltage-lowering side switching modulation degrees E0, E1, E2 . . . E5 satisfy the relationship of E0<E1<E2<E3<E4<E5. The modulation degree E5 is smaller than the voltage-raising side switching modulation degree Ea (E5<Ea). For example, the initial voltage-raising side switching modulation degree E0 is set to be larger than the upper-limit modulation degree of 0.61 of the sine-wave PWM control mode. The voltage-raising side switching modulation degree Ea is also set to be larger than the upper-limit modulation degree of 0.61. However, any of the modulation degrees such as the voltage-raising side switching modulation degree Ea may be set to be equal to the upper-limit modulation degree of 0.61. Further, as seen from FIG. 11, when the vehicle shifts from a slip state to a grip state, the absolute value of variation in the number of revolutions becomes greater, and hence the voltage-lowering side switching modulation degree Ei also becomes larger. FIG. 11 shows only an example of the relationship between variation in the number of revolutions and switching modulation degree, and another example may be employed.

Figure 12:
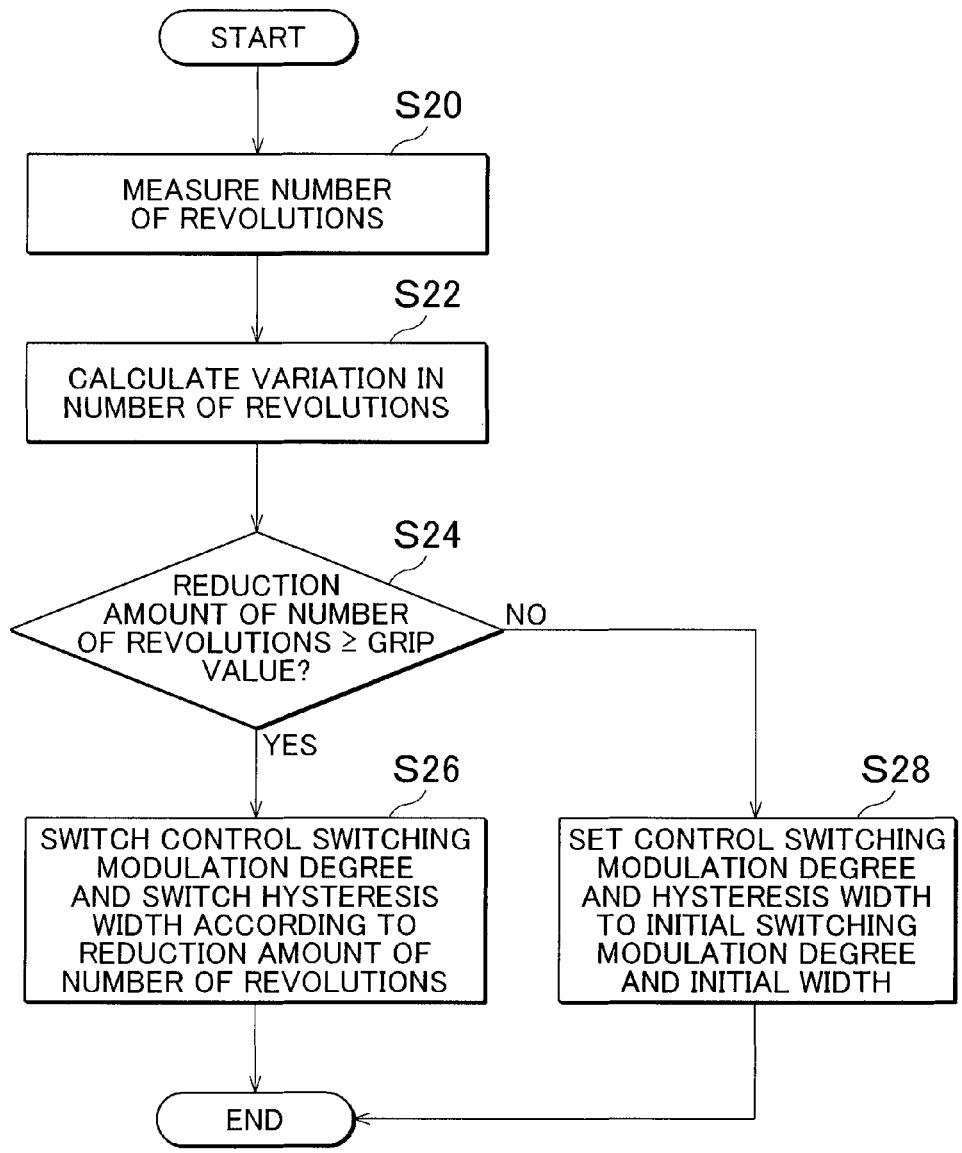
FIG. 12 is a flow chart showing a method of switching a control mode of the rotary electric machine according to the second embodiment.

FIG. 12 is a flow chart showing a method of switching the control mode of the rotary electric machine 14 according to the second embodiment. Firstly, in step S20, the number of revolutions per predetermined time period of the rotary electric machine 14 is measured by the number-of-revolutions measurement unit. Subsequently, a variation in the number of revolutions per predetermined time period is calculated (S22). In S24, when the calculated number of revolutions has decreased by a preset grip value or more (for example, in FIG. 11, when the absolute value of variation in the number of revolutions per predetermined time period is 25 or more), the method proceeds to S26.

In S26, the voltage-lowering side switching modulation degree as the control switching modulation degree is changed, or switched to the corresponding one of the plurality of sudden-change voltage-lowering side switching modulation degrees Ei in accordance with the variation in the number of revolutions of the rotary electric machine 14. As a result of this, the hysteresis widths D1, D2 that are differences between the voltage-raising side switching modulation degree Ea and the voltage-lowering side switching modulation degrees E0, Ei are changed in accordance with the variation in the number of revolutions. In this case, map data representing the relationship between variation of the number of revolutions and the switching modulation degrees E0, Ei shown in FIG. 11 is stored in advance in the controller 32, and the controller 32 changes the control switching modulation degrees E0, Ei and the hysteresis widths D1, D2 with reference to this map data.

In contrast, when the calculated number of revolutions has not decreased by the preset grip value or more in S24 (for example, in FIG. 11, the absolute value of variation in the number of revolutions per predetermined time period has not decreased by 25 or more), the method proceeds to S28. In S28, the voltage-lowering side switching modulation degree is set to the initial voltage-lowering side switching modulation degree E0. Therefore, the hysteresis width is set to the initial hysteresis width D1 that is a difference between the initial voltage-lowering side switching modulation degree E0 and the voltage-raising side switching modulation degree Ea, that is, to the default value.

According to the second embodiment as described above, the threshold changing unit 50 changes the control switching modulation degree used for switching the control mode of the rotary electric machine 14 from the over-modulation control mode to the sine-wave PWM control mode, in accordance with a measurement result of the number of revolutions of the rotary electric machine 14. Further, when the measured number of revolutions has decreased by a preset grip value or more, the threshold changing unit 50 changes the voltage-lowering side switching modulation degree to the sudden-change voltage-lowering side switching modulation degree Ei that is larger than the initial voltage-lowering side switching modulation degree E0 in accordance with a variation in the number of revolutions. When the measured number of revolutions has not decreased by the preset grip value or more, the threshold changing unit 50 sets the voltage-lowering side switching modulation degree to the initial voltage-lowering side switching modulation degree E0. In other words, in accordance with the variation in the number of revolutions of the rotary electric machine 14, the hysteresis widths D1, D2 for preventing chattering in control are switched so as to become smaller when the number of revolutions suddenly drops. As a result, the voltage to be applied to the rotary electric machine 14 can be reduced earlier than normal when the number of revolutions of the rotary electric machine 14 has suddenly dropped during execution of the over-modulation control mode, and hence overcurrent flowing through the rotary electric machine 14 can be effectively suppressed.

In the description above, whether or not the control switching modulation degree is to be changed is determined depending on whether or not the reduction amount of the number of revolutions per predetermined time period of the rotary electric machine 14 is equal to the grip value or more, that is, whether or not a grip has occurred. However, occurrence of a slip can be substituted for occurrence of a grip as the condition for changing the control switching modulation degree. For example, when the number of revolutions per predetermined time period of the rotary electric machine 14 has surged to a predetermined value or more, it is determined that a slip has occurred in the vehicle. The detection of a slip can be used as the condition because a grip invariably occurs following occurrence of a slip. Therefore, it is also possible to determine an occurrence of a slip or grip by using an absolute value of a variation in the number of revolutions instead of using a reduction amount of the number of revolutions.

Further, instead of changing the hysteresis widths D1, D2 according to a variation in the number of revolutions of the rotary electric machine 14 as described above, the threshold changing unit 50 may be configured to change the hysteresis width, or the voltage-lowering side switching modulation degree in accordance with a variation in the applied voltage or a variation in torque or current, at sudden change of voltage to be applied to the rotary electric machine 14, or at a sudden change of torque or current. This is because sudden change of voltage, torque or current occurs at the time of occurrence of a grip or slip.

It is also possible to switch the control switching modulation degree according to a variation in the number of revolutions or the like exclusively for a high torque range where current might be increased by suddenly switching from the over-modulation control mode to the sine-wave PWM control mode.

Further it is also possible to calculate a control switching modulation degree from a variation in the number of revolutions with use of a relational expression (for example, a relational expression using proportion) stored in advance in the controller 32, instead of retrieving the control switching modulation degree from the map data. The other configurations and functions are the same as those of the first embodiment described above.

Further, the invention may be implemented by combining the first embodiment shown in FIGS. 1 to 6 and the second embodiment shown in FIGS. 7 to 12. Specifically, a controller according to this another embodiment may be a controller in which the phase mode switching unit 44 has a threshold changing unit 50 (see FIG. 2) and the modulation mode switching unit 46 has a threshold changing unit 50 (see FIG. 7).

The rotary electric machine control system according to the invention is applicable to control of a rotary electric machine mounted on a fuel-cell electric vehicle, a hybrid vehicle, or the like.

The invention has been described with reference to example embodiments for illustrative purposes only. It should be understood that the description is not intended to be exhaustive or to limit form of the invention and that the invention may be adapted for use in other systems and applications. The scope of the invention embraces various modifications and equivalent arrangements that may be conceived by one skilled in the art.

The invention claimed is:

1. A rotary electric machine control system comprising:
   a measurement device that measures number of revolutions per predetermined time period of a rotary electric machine; and
   a threshold changing unit configured to change a control switching threshold to be used for switching a control mode of the rotary electric machine to another control mode of the rotary electric machine, in accordance with a measurement result of the number of revolutions when the measured number of revolutions has increased by a preset slip value or more, wherein
   the control switching threshold is a control switching phase on a d-q plane having a d-axis and a q-axis intersecting orthogonally with each other, on which an operating point of the rotary electric machine moves, wherein the control switching phase is used for switching the control mode of the rotary electric machine from a rectangular-wave control mode to an over-modulation control mode;
   the threshold changing unit is configured to change the control switching phase to be used for switching the control mode of the rotary electric machine from the rectangular-wave control mode to the over-modulation control mode, in accordance with the measurement result of the number of revolutions;
   the threshold changing unit is configured to change the control switching phase to a sudden-change switching phase that is on a smaller angle side of a current command line drawn by connecting current commands when operation of the rotary electric machine is instructed by current control, and that is on a larger angle side of an initial switching phase, in accordance with a variation in the number of revolutions when the measured number of revolutions has increased by the preset slip value or more; and
   the threshold changing unit is configured to set the control switching phase to the initial switching phase when the measured number of revolutions has not increased by the preset slip value or more,
   wherein the initial switching phase corresponds to a phase value a, and the sudden-change switching phase corresponds to one of a plurality of phase values including values b, c, and d, and
   wherein a is greater than b, b is greater than c, and c is greater than d, wherein a, b, c, and d are angles that correspond to variation in the numbers of revolutions.

2. A rotary electric machine control method comprising:
   measuring number of revolutions per predetermined time period of a rotary electric machine; and
   changing a control switching threshold to be used for switching a control mode of the rotary electric machine to another control mode of the rotary electric machine, in accordance with a measurement result of the number of revolutions when the measured number of revolutions has increased by a preset slip value or more, wherein
   the control switching threshold is a control switching phase on a d-q plane having a d-axis and a q-axis intersecting orthogonally with each other, on which an operating point of the rotary electric machine moves, wherein the control switching phase is used for switching the control mode of the rotary electric machine from a rectangular-wave control mode to an over-modulation control mode;
   when the control switching threshold is changed, the control switching phase to be used for switching the control mode of the rotary electric machine from the rectangular-wave control mode to the over-modulation control mode is changed in accordance with the measurement result of the number of revolutions;
   changing the control switching phase to a sudden-change switching phase that is on a smaller angle side of a current command line drawn by connecting current commands when operation of the rotary electric machine is instructed by current control, and that is on a larger angle side of an initial switching phase, in accordance with a variation in the number of revolutions when the measured number of revolutions has increased by the preset slip value or more; and setting the control switching phase to the initial switching phase when the measured number of revolutions has not increased by the preset slip value or more, wherein the initial switching phase corresponds to a phase value a, and the sudden-change switching phase corresponds to one of a plurality of phase values including values b, c, and d, and wherein a is greater than b, b is greater than c, and c is greater than d, wherein a, b, c, and d are angles that correspond to variation in the numbers of revolutions.

3. A rotary electric machine control system comprising:

a measurement device that measures number of revolutions per predetermined time period of a rotary electric machine; and a threshold changing unit configured to change a control switching threshold to be used for switching a control mode of the rotary electric machine to another control mode of the rotary electric machine, in accordance with a measurement result of the number of revolutions when the measured number of revolutions has increased by a preset slip value or more; wherein the control switching threshold is a control switching modulation degree that is used for switching the control mode of the rotary electric machine from the over-modulation control mode to a sine-wave pulse width modulation (PWM) control mode, the control switching modulation degree being a value of a modulation degree that is a ratio of an effective value of a line-to-line voltage that is a voltage to be applied to the rotary electric machine to a system voltage that is a direct-current (DC) voltage of an inverter;

the threshold changing unit is configured to change the control switching modulation degree to be used for switching the control mode of the rotary electric machine from the over-modulation control mode to the sine-wave PWM control mode, in accordance with the measurement result of the number of revolutions;

the threshold changing unit is configured to change the control switching modulation degree to a sudden-change switching modulation degree that is larger than an initial switching modulation degree, in accordance with a variation in the number of revolutions when the measured number of revolutions has increased by the preset slip value or more; and the threshold changing unit is configured to set the control switching modulation degree to the initial switching modulation degree when the measured number of revolutions has not increased by the preset slip value or more, wherein the initial switching modulation degree corresponds to a degree a, and the sudden-change switching modulation degree corresponds to one of a plurality of degrees including degrees b, c, and d, and wherein a is greater than b, b is greater than c, and c is greater than d, wherein a, b, c, and d are angles that correspond to variation in the numbers of revolutions.

4. A rotary electric machine control method comprising:

measuring number of revolutions per predetermined time period of a rotary electric machine; and changing a control switching threshold to be used for switching a control mode of the rotary electric machine to another control mode of the rotary electric machine, in accordance with a measurement result of the number of revolutions when the measured number of revolutions has increased by a preset slip value or more, wherein the control switching threshold is a control switching modulation degree that is used for switching the control mode of the rotary electric machine from the over-modulation control mode to a sine-wave pulse width modulation (PWM) control mode, the control switching modulation degree being a value of a modulation degree that is a ratio of an effective value of a line-to-line voltage that is a voltage to be applied to the rotary electric machine to a system voltage that is a DC voltage of an inverter;

when the control switching threshold is changed, the control switching modulation degree to be used for switching the control mode of the rotary electric machine from the over-modulation control mode to the sine-wave PWM control mode is changed in accordance with the measurement result of the number of revolutions;

changing the control switching modulation degree to a sudden-change switching modulation degree that is larger than an initial switching modulation degree, in accordance with a variation in the number of revolutions when the measured number of revolutions has increased by the preset slip value or more; and setting the control switching modulation degree to the initial switching modulation degree when the measured number of revolutions has not increased by the preset slip value or more, wherein the initial switching modulation degree corresponds to a degree a, and the sudden-change switching modulation degree corresponds to one of a plurality of degrees including degrees b, c, and d, and wherein a is greater than b, b is greater than c, and c is greater than d, wherein a, b, c, and d are angles that correspond to variation in the numbers of revolutions.

* * * * *